United States Patent
Hagiwara (10) Patent No.: US 10,594,944 B2
(45) Date of Patent: Mar. 17, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Yasuaki Hagiwara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 363 days.

(21) Appl. No.: 15/629,003

(22) Filed: Jun. 21, 2017

(65) Prior Publication Data

US 2017/0374291 A1 Dec. 28, 2017

(30) Foreign Application Priority Data

Jun. 27, 2016 (JP) ................. 2016-126417

(51) Int. Cl.
| | | |
|---|---|---|
| *G02B 15/14* | (2006.01) | |
| *G02B 21/02* | (2006.01) | |
| *G02B 13/02* | (2006.01) | |
| *G02B 13/04* | (2006.01) | |
| *G02B 9/60* | (2006.01) | |
| *H04N 5/232* | (2006.01) | |
| *G02B 15/15* | (2006.01) | |
| *G02B 15/20* | (2006.01) | |
| *G02B 15/173* | (2006.01) | |
| *G02B 27/00* | (2006.01) | |

(52) U.S. Cl.
CPC ....... *H04N 5/23296* (2013.01); *G02B 15/155* (2013.01); *G02B 15/20* (2013.01); *G02B 15/173* (2013.01); *G02B 27/0025* (2013.01)

(58) Field of Classification Search
CPC ...... G02B 15/177; G02B 21/02; G02B 13/18; G02B 13/02; G02B 13/04; G02B 9/60; G02B 13/24
USPC ....... 359/689, 659, 714, 746, 753, 763–764, 359/766
See application file for complete search history.

(56) References Cited

U.S. PATENT DOCUMENTS

2014/0268364 A1  9/2014  Hagiwara

FOREIGN PATENT DOCUMENTS

| JP | H10-111456 A | 4/1998 |
|---|---|---|
| JP | 2009-244443 A | 10/2009 |

*Primary Examiner* — Dawayne Pinkney
(74) *Attorney, Agent, or Firm* — Carter, DeLuca & Farrell LLP (57) ABSTRACT

Provided is a zoom lens, including, in order from an object side, a positive first lens unit, a negative second lens unit, a positive third lens unit, a negative fourth lens unit, and a positive fifth lens unit, in which an interval between each pair of adjacent lens units is changed during zooming, in which the second lens unit moves during focusing, and includes, in order from the object side to the image side, a negative lens, a negative lens, a positive lens, and a negative lens, and in which a focal length of the second lens unit, a thickness of the second lens unit on an optical axis, a refractive index of a material of the positive lens included in the second lens unit, and an average value of refractive indices of materials of the negative lenses included in the second lens unit are each appropriately set.

16 Claims, 7 Drawing Sheets

ZOOM LENS AND IMAGE PICKUP APPARATUS INCLUDING THE SAME

BACKGROUND OF THE INVENTION

Field of the Invention

The present invention relates to a zoom lens, which is suitable for, for example, an image pickup optical system used in an image pickup apparatus, for example, a digital still camera, a video camera, a monitoring camera, a broadcasting camera, or a silver-halide film camera.

Description of the Related Art

In recent years, image pickup apparatus using a solid state image pickup element have been reduced in its entire size. Thus, image pickup optical systems that are used in the image pickup apparatus are demanded to be zoom lenses having a short total lens length and high optical performance over the entire zoom range. Further, the image pickup optical systems are demanded to be zoom lenses employing a focusing method that enables high-speed autofocusing.

A zoom lens employing an inner focusing method as the focusing method includes a focusing lens unit having a small effective diameter compared to a zoom lens in which a first lens unit moves for focusing, and thus the entire lens system is easily reduced in size.

As a configuration for satisfying those demands, there is known a five-unit zoom lens including, in order from an object side to an image side, first to fifth lens units having positive, negative, positive, negative, and positive refractive powers, respectively. In each of Japanese Patent Application Laid-Open No. 2009-244443 and Japanese Patent Application Laid-Open No. H10-111456, there is disclosed a zoom lens in which a second lens unit moves during focusing.

In the five-unit zoom lens having the refractive power arrangement described above, when the refractive power of each lens unit is simply increased in order to reduce the entire system in size, aberration variation during zooming is increased, and aberration variation during focusing is also increased. As a result, it is difficult to obtain high optical performance over the entire zoom range and the entire object distance.

SUMMARY OF THE INVENTION

It is an object of the present invention to provide a zoom lens that has a high zoom ratio, easily achieves high optical performance over the entire zoom range and the entire object distance range, and is compact as the entire system, and an image pickup apparatus including the zoom lens.

According to one embodiment of the present invention, there is provided a zoom lens, comprising, in order from an object side to an image side:

a first lens unit having a positive refractive power;
a second lens unit having a negative refractive power;
a third lens unit having a positive refractive power;
a fourth lens unit having a negative refractive power; and
a fifth lens unit having a positive refractive power,
in which an interval between each pair of adjacent lens units is changed during zooming,
in which the second lens unit moves during focusing, and comprises, in order from the object side to the image side, a negative lens, a negative lens, a positive lens, and a negative lens, and in which the following conditional expressions are satisfied:

$$1.065 < B2D/|f2| < 1.190;$$

$$1.85 < B2PN;\ \text{and}$$

$$1.85 < B2NaveN,$$

where f2 represents a focal length of the second lens unit, B2D represents a thickness of the second lens unit on an optical axis, B2PN represents a refractive index of a material of the positive lens included in the second lens unit, and B2NaveN represents an average value of refractive indices of materials of the negative lenses included in the second lens unit.

Further features of the present invention will become apparent from the following description of exemplary embodiments with reference to the attached drawings.

DESCRIPTION OF THE EMBODIMENTS

Now, exemplary embodiments of the present invention are described with reference to the attached drawings. A zoom lens according to the present invention includes, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power. An interval between each pair of adjacent lens units is changed during zooming, and the second lens unit moves during focusing.

Figure 1:
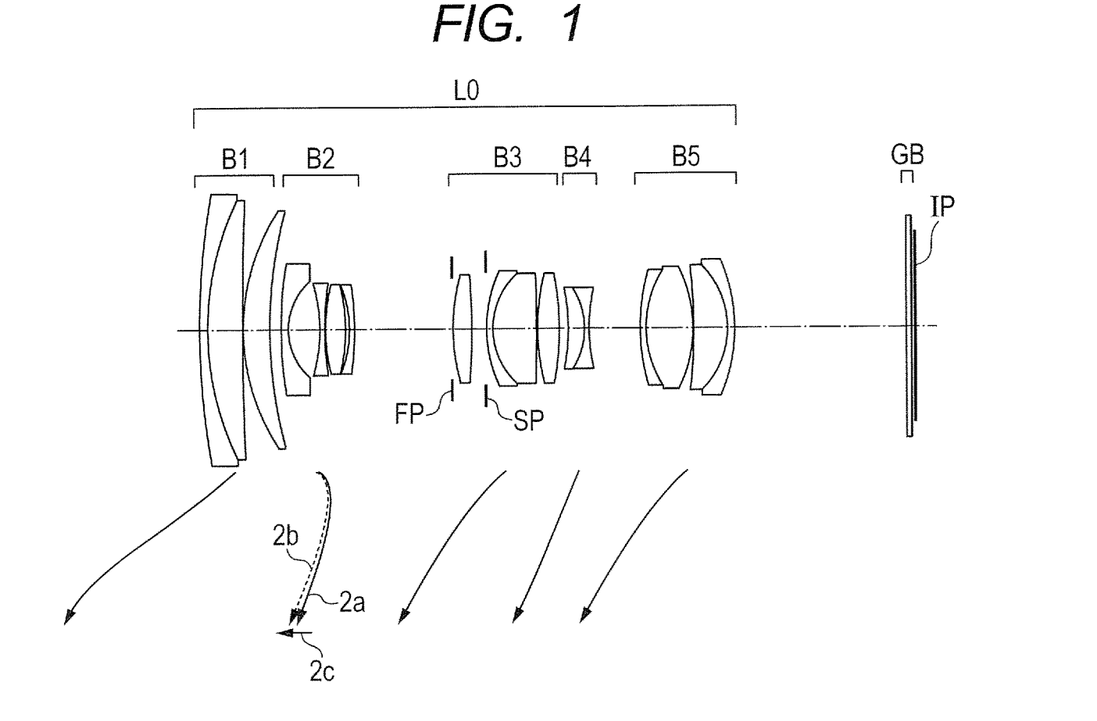
FIG. 1 is a lens cross-sectional view of a zoom lens according to Embodiment 1 of the present invention at a wide angle end.
Figure 2A:
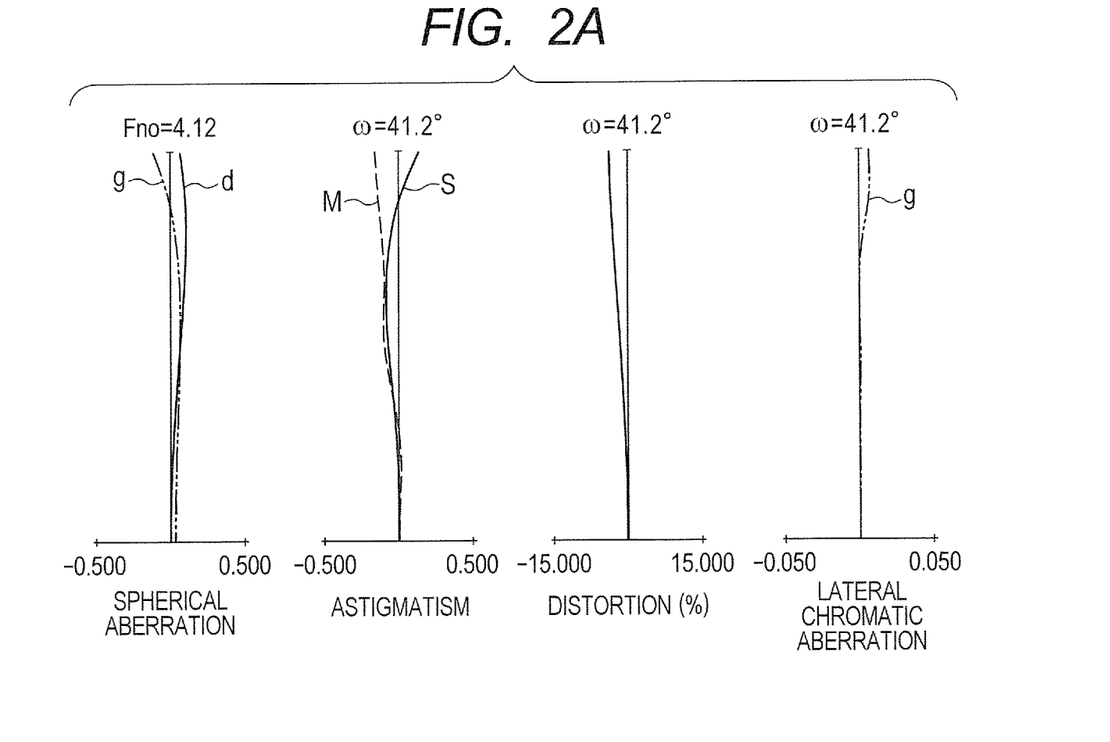
FIG. 2A is aberration diagrams of the zoom lens of Embodiment 1 at the wide angle end.
Figure 2B:
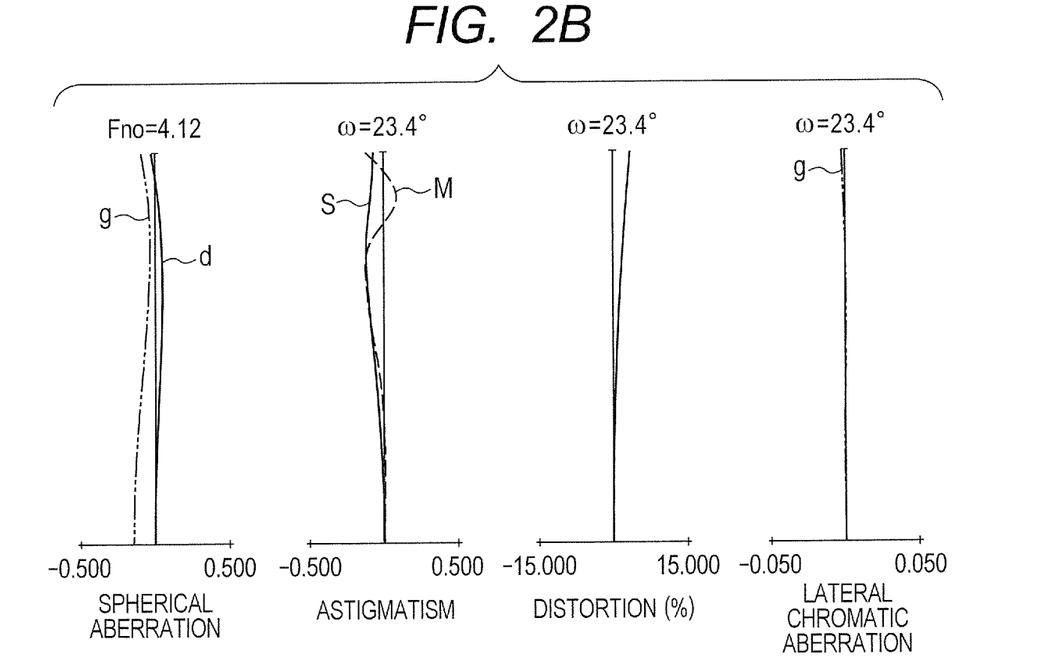
FIG. 2B is aberration diagrams of the zoom lens of Embodiment 1 at an intermediate zoom position.
Figure 2C:
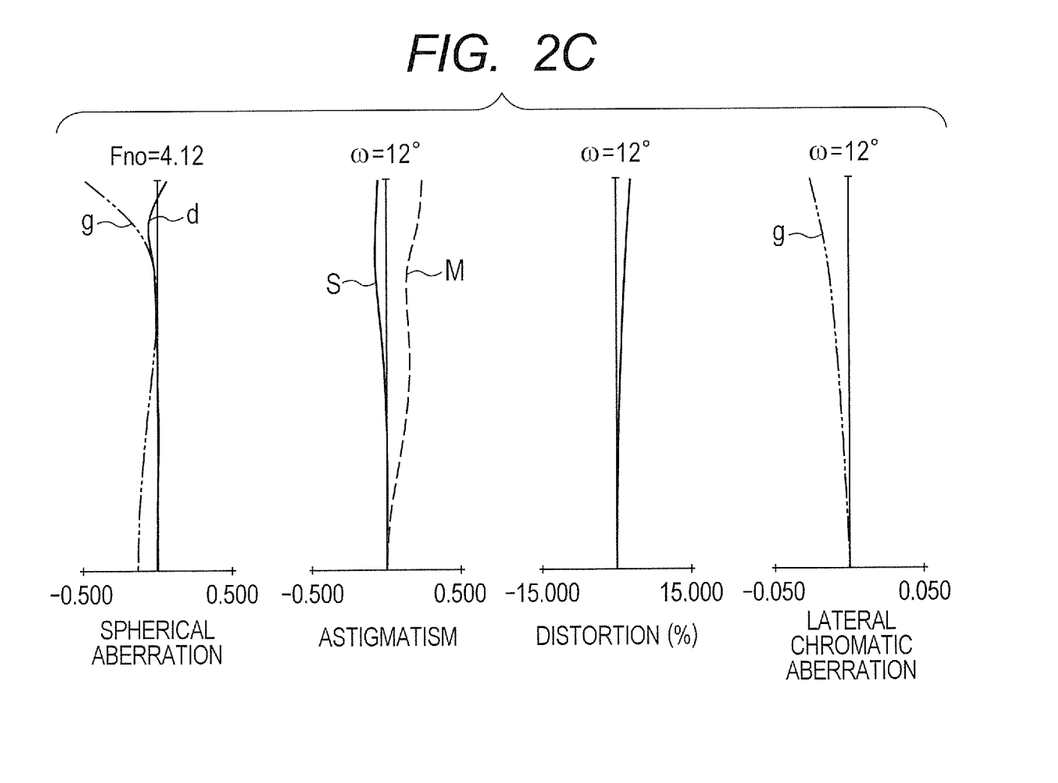
FIG. 2C is aberration diagrams of the zoom lens of Embodiment 1 at a telephoto end.

FIG. 1 is a lens cross-sectional view of a zoom lens according to Embodiment 1 of the present invention at a wide angle end (short focal length end). FIG. 2A, FIG. 2B, and FIG. 2C are aberration diagrams of the zoom lens of Embodiment 1 at the wide angle end, an intermediate zoom position, and a telephoto end (long focal length end), respectively. The zoom lens of Embodiment 1 has a zoom ratio of about 4.1 and an F-number of about 4.1.

Figure 3:
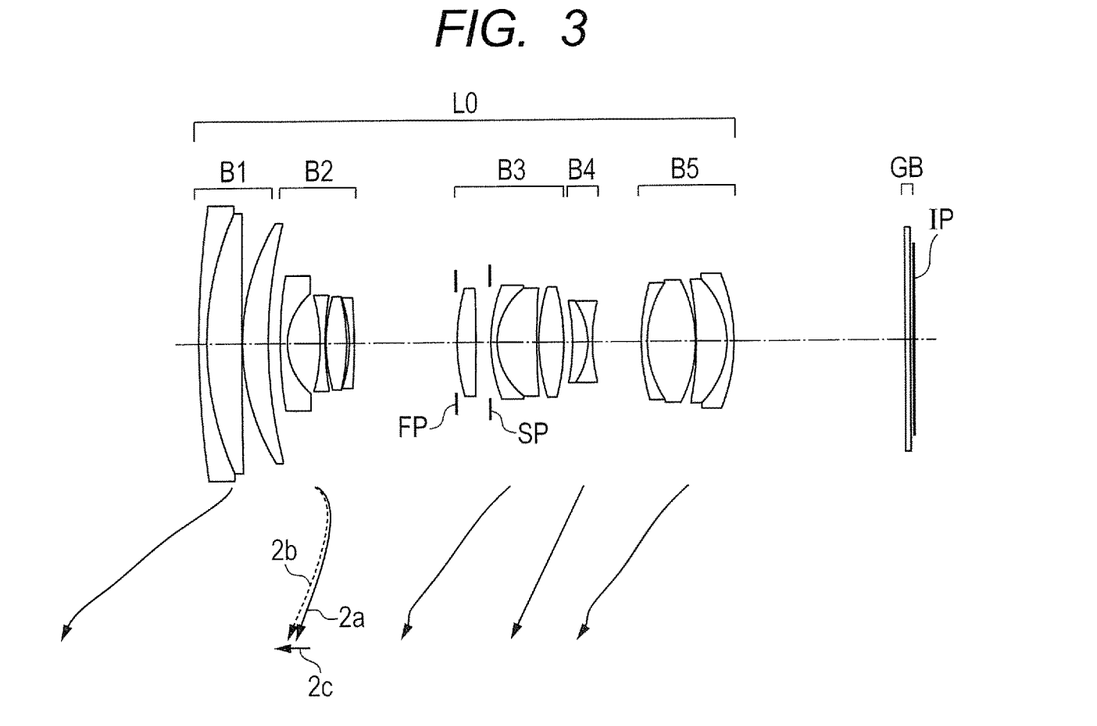
FIG. 3 is a lens cross-sectional view of a zoom lens according to Embodiment 2 of the present invention at the wide angle end.
Figure 4A:
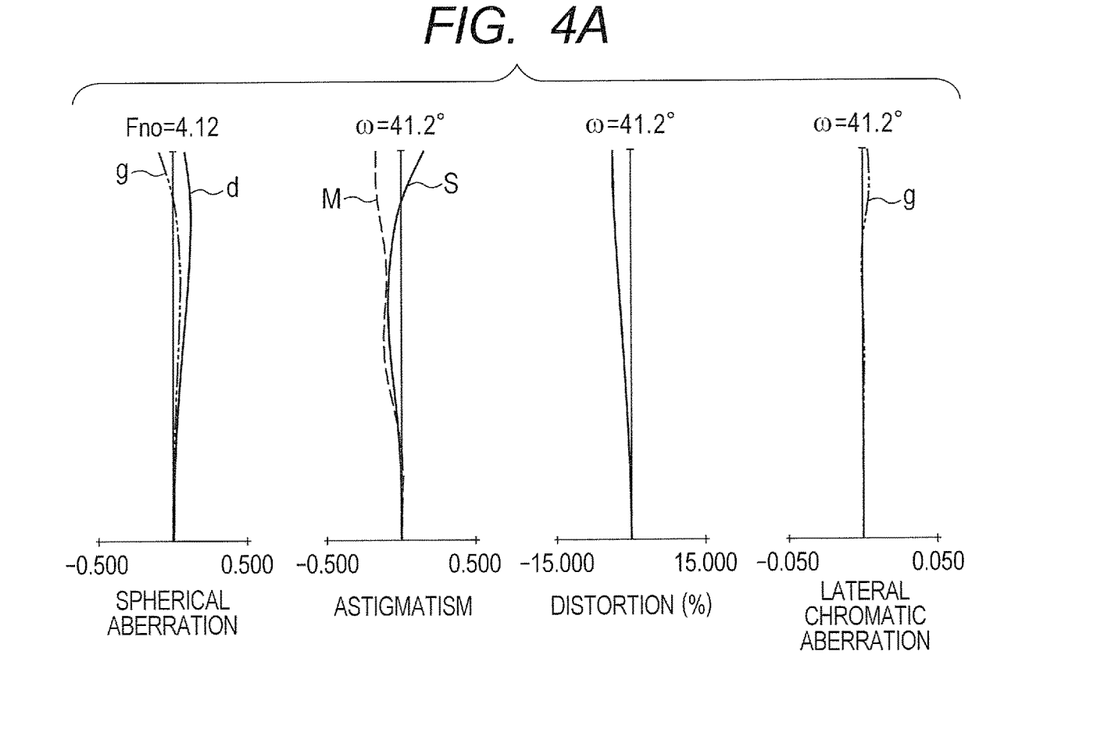
FIG. 4A is aberration diagrams of the zoom lens of Embodiment 2 at the wide angle end.
Figure 4B:
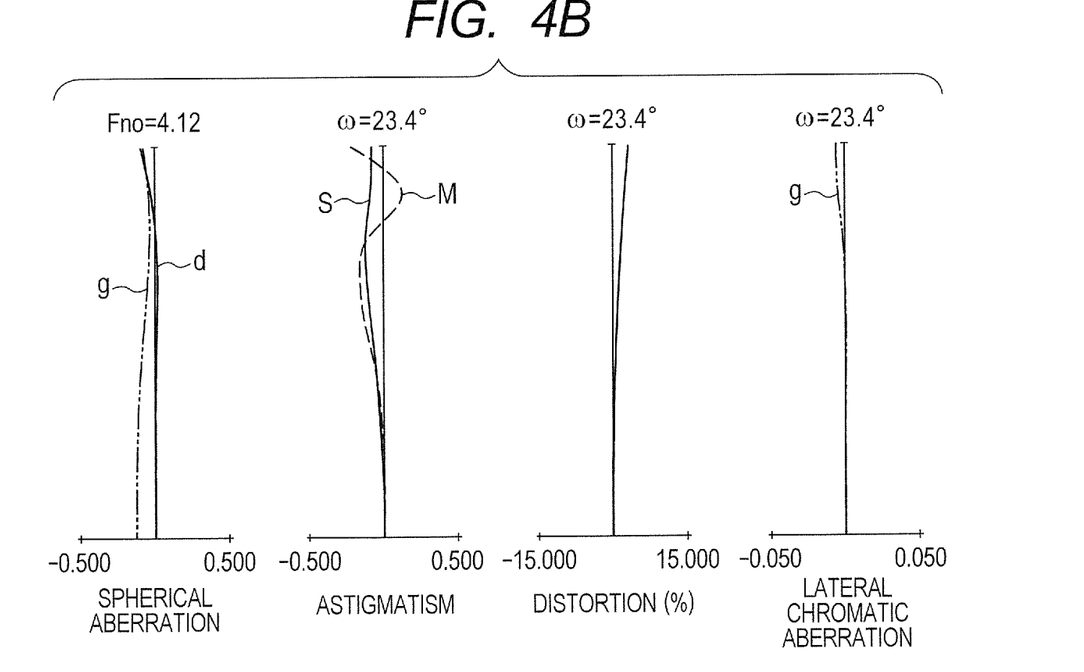
FIG. 4B is aberration diagrams of the zoom lens of Embodiment 2 at the intermediate zoom position.
Figure 4C:
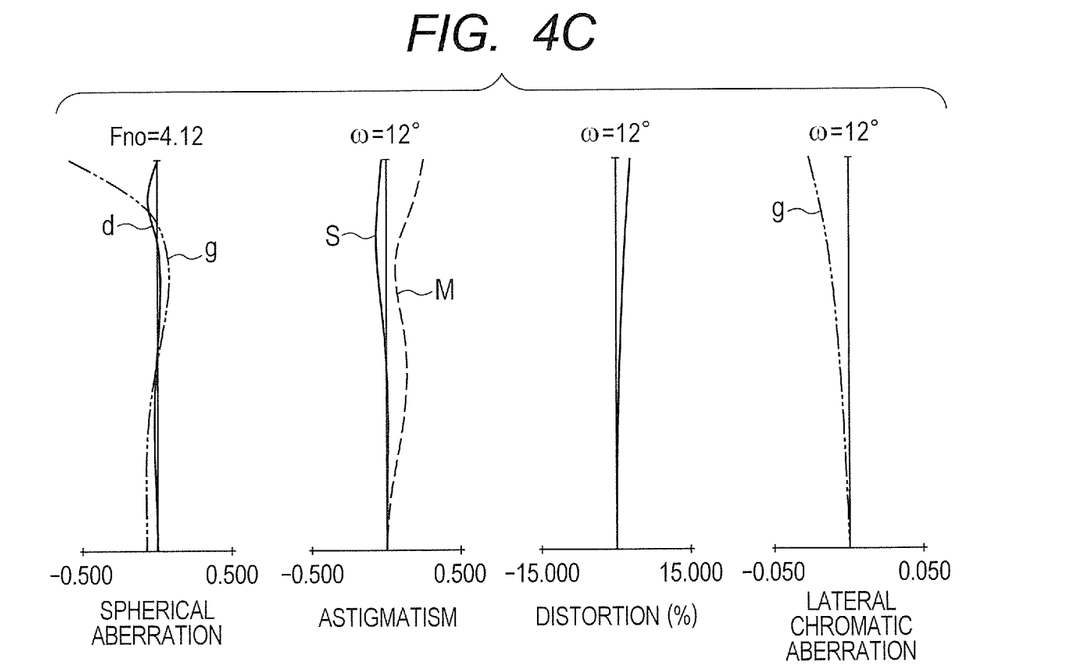
FIG. 4C is aberration diagrams of the zoom lens of Embodiment 2 at the telephoto end.

FIG. 3 is a lens cross-sectional view of a zoom lens according to Embodiment 2 of the present invention at a wide angle end. FIG. 4A, FIG. 4B, and FIG. 4C are aberration diagrams of the zoom lens of Embodiment 2 at the wide angle end, an intermediate zoom position, and a telephoto end, respectively. The zoom lens of Embodiment 2 has a zoom ratio of about 4.1 and an F-number of about 4.1.

Figure 5:
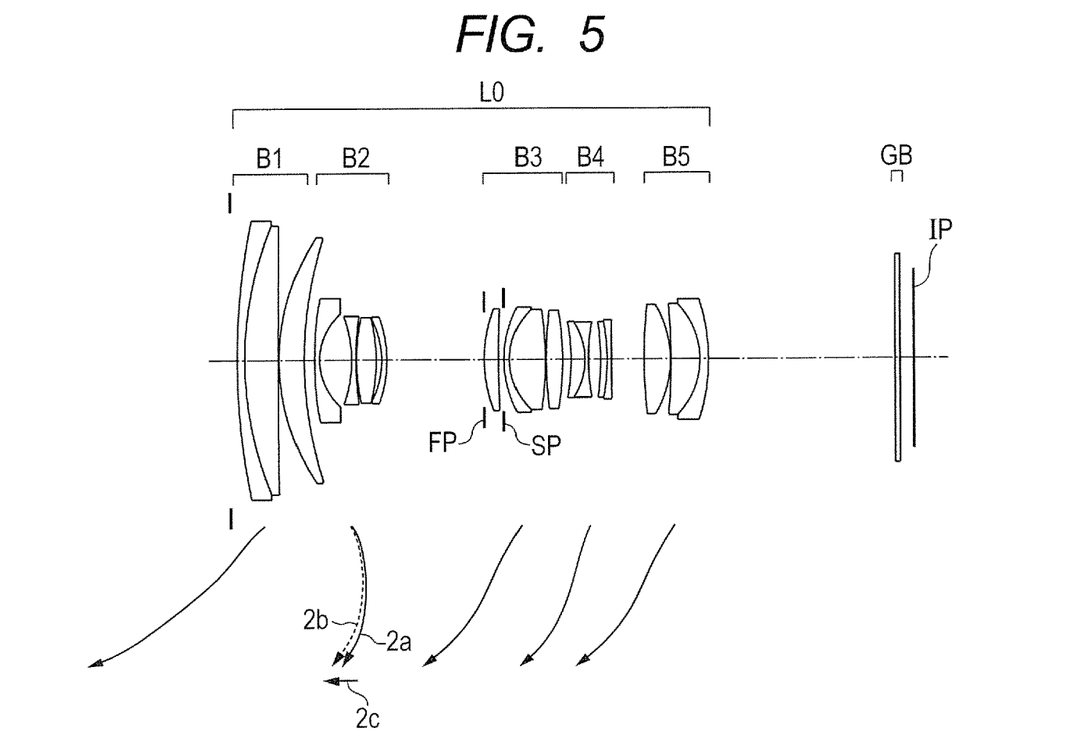
FIG. 5 is a lens cross-sectional view of a zoom lens according to Embodiment 3 of the present invention at the wide angle end.
Figure 6A:
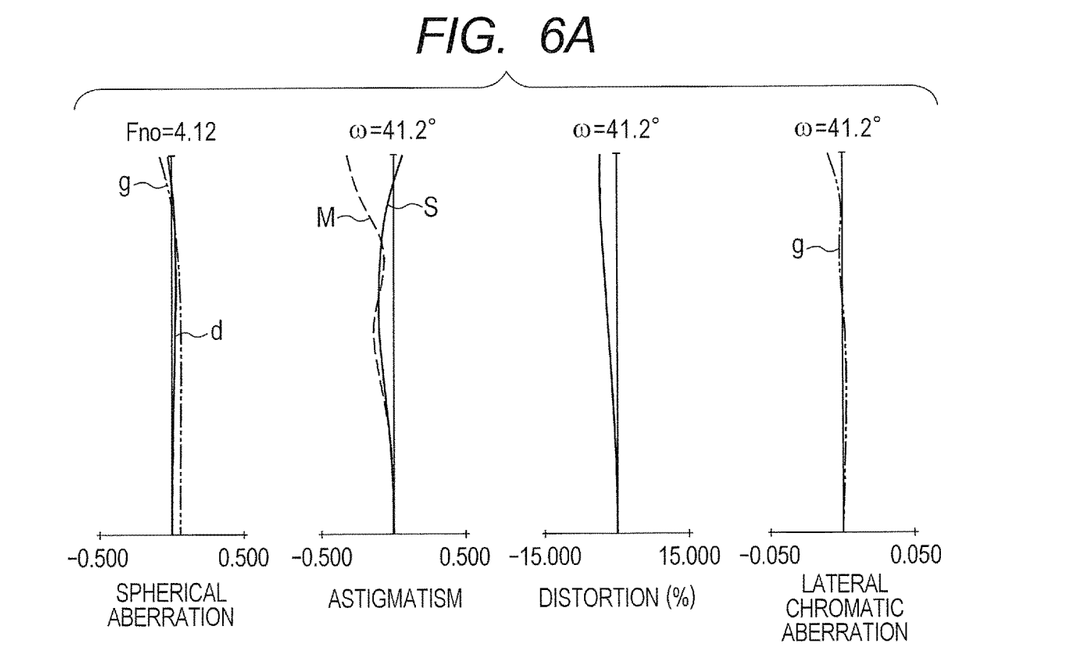
FIG. 6A is aberration diagrams of the zoom lens of Embodiment 3 at the wide angle end.
Figure 6B:
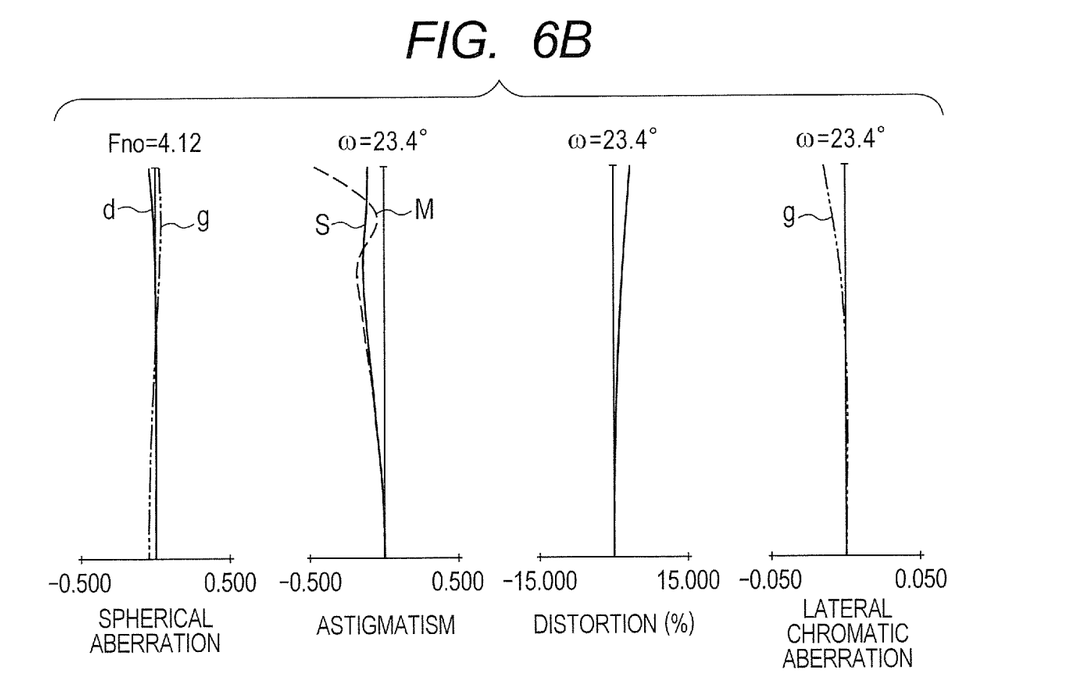
FIG. 6B is aberration diagrams of the zoom lens of Embodiment 3 at the intermediate zoom position.
Figure 6C:
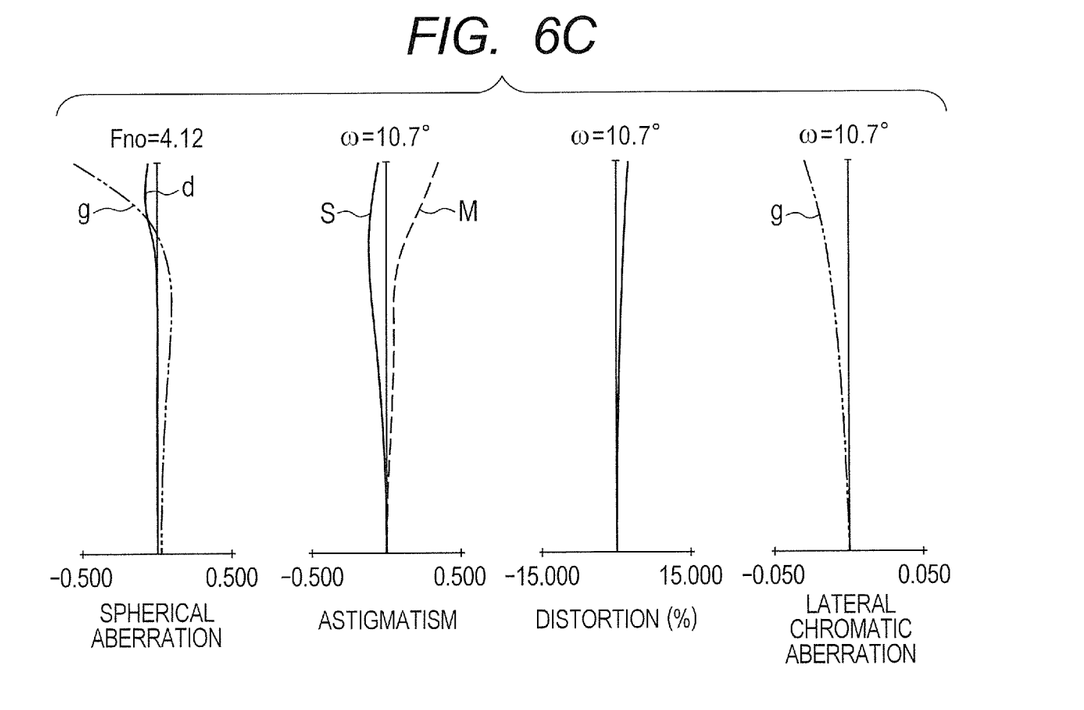
FIG. 6C is aberration diagrams of the zoom lens of Embodiment 3 at the telephoto end.
Figure 7:
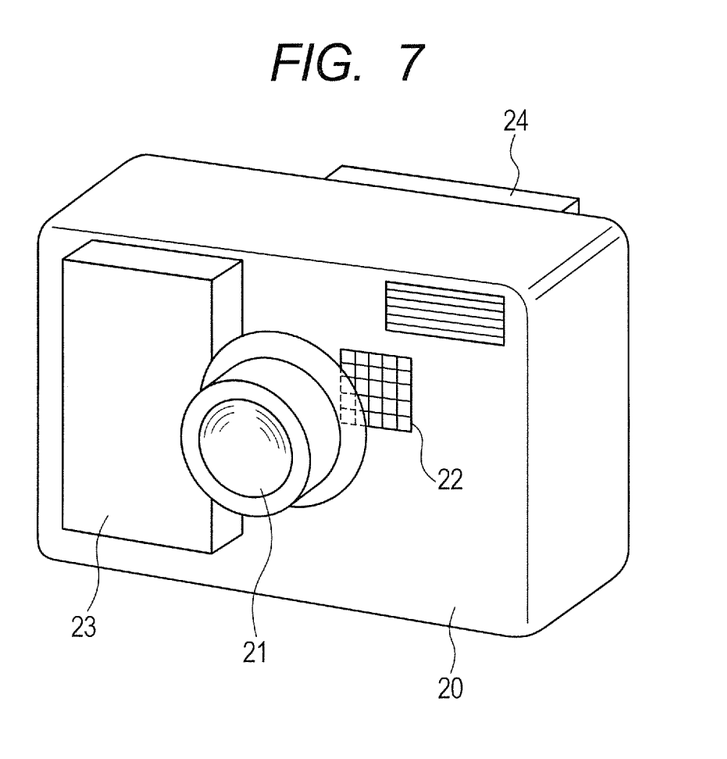
FIG. 7 is a schematic view of a main part as an embodiment of an image pickup apparatus of the present invention.

FIG. 5 is a lens cross-sectional view of a zoom lens according to Embodiment 3 of the present invention at a wide angle end. FIG. 6A, FIG. 6B, and FIG. 6C are aberration diagrams of the zoom lens of Embodiment 3 at the wide angle end, an intermediate zoom position, and a telephoto end, respectively. The zoom lens of Embodiment 3 has a zoom ratio of about 4.6 and an F-number of about 4.1. FIG. 7 is a schematic view of a main part of an image pickup apparatus of the present invention.

The zoom lens in each Embodiment is an image pickup optical system used in an image pickup apparatus, for example, a video camera, a digital camera, a monitoring camera, or a TV camera. In the lens cross-sectional views, the left side is a subject side (object side) (front side), and the right side is an image side (rear side). In the lens cross-sectional views, a zoom lens L0 is illustrated. There are also illustrated a first lens unit B1 having a positive refractive power (optical power=reciprocal of a focal length), a second lens unit B2 having a negative refractive power, a third lens unit B3 having a positive refractive power, a fourth lens unit B4 having a negative refractive power, and a fifth lens unit B5 having a positive refractive power.

In the lens cross-sectional views in respective Embodiments, an aperture stop SP, which determines a light flux at an open F-number, is arranged in the third lens unit B3. A flare cut stop FP is arranged on the object side of the third lens unit B3. An optical block GB corresponds to, for example, an optical filter or a face plate. An image plane IP corresponds to an image pickup surface of a solid state image pickup element (photoelectric conversion element), for example, a CCD sensor or a CMOS sensor when the zoom lens is used as an image pickup optical system of a video camera or a digital camera, and corresponds to a film surface when the zoom lens is used as an image pickup optical system of a silver-halide film camera.

In the aberration diagrams, an F-number is represented by Fno, and a half angle of view (degrees) is represented by ω. In spherical aberration, a d-line (wavelength: 587.6 nm) is represented by d, and a g-line (wavelength: 435.8 nm) is represented by g. In astigmatism, a meridional image plane and a sagittal image plane with respect to the d-line are represented by M and S, respectively. In distortion, the d-line is shown. In lateral chromatic aberration, the g-line with respect to the d-line is shown.

In the lens cross-sectional views, the arrows indicate movement loci of the lens units and the aperture stop SP during zooming from the wide angle end to the telephoto end and movement directions thereof at a time of focusing from an object at infinity to an object at a short distance.

In each Embodiment, during zooming from the wide angle end to the telephoto end, as indicated by the arrows, the first lens unit B1 moves toward the object side. The second lens unit B2 moves toward the image side and then toward the object side. The third lens unit B3 moves toward the object side. The fourth lens unit B4 to move toward the object side. Further, the fifth lens unit B5 moves toward the object side. A lens unit interval between each pair of lens units is changed during zooming.

In each Embodiment, the second lens unit B2 is moved on the optical axis to perform focusing. A solid curve 2a and a dotted curve 2b regarding the second lens unit B2 are movement loci for correcting an image plane variation accompanying varying magnification when focusing at the object at infinity and the object at the short distance, respectively. Moreover, in a case where focusing is performed from the object at infinity to the object at the short distance at the telephoto end, the focusing is performed by extending the second lens unit B2 toward the object side as indicated by an arrow 2c.

In the zoom lens of each Embodiment, during zooming from the wide angle end to the telephoto end, the interval between each pair of lens units is changed so that aberration may be satisfactorily corrected over the entire zoom range. Further, in order from the object side to the image side, the first lens unit B1 has the positive refractive power, the second lens unit B2 has the strong negative refractive power, the third lens unit B3 has the positive refractive power, the fourth lens unit B4 has the negative refractive power, and the fifth lens unit B5 has the positive refractive power. As a result, a compact entire system and a high zoom ratio are obtained.

Further, the second lens unit B2 consists of, in order from the object side to the image side, a negative lens, a negative lens, a positive lens, and a negative lens, and moves during focusing. With this configuration, focusing is easily performed with a small movement amount of the second lens unit B2, and fluctuations in optical performance during focusing are reduced.

In each Embodiment, the lens configuration of the second lens unit B2 is set as follows. The second lens unit B2 includes, in order from the object side to the image side, the negative lens, the negative lens, the positive lens, and the negative lens. The focal length of the second lens unit B2 is represented by f2, the thickness of the second lens unit B2 on the optical axis (a length from a lens surface of the second lens unit B2 on the object side to a lens surface thereof on the image side) is represented by B2D, and the refractive index of a material of the positive lens in the second lens unit B2 is represented by B2PN. The average value of the refractive indices of materials of the negative lenses in the second lens unit B2 is represented by B2NaveN.

In this case, the following conditional expressions are satisfied.

$$1.065 < B2D/|f2| < 1.190 \quad (1)$$

$$1.85 < B2PN \quad (2)$$

$$1.85 < B2NaveN \quad (3)$$

Conditional Expression (1) relates to a preferred range of the ratio of the thickness of the second lens unit B2 on the optical axis to the focal length of the second lens unit B2. When the negative focal length of the second lens unit B2 is reduced too much (when the absolute value of the negative focal length is reduced too much) and the ratio exceeds the upper limit of Conditional Expression (1), it is difficult to correct aberration variation accompanying focusing, particularly, lateral chromatic aberration and axial chromatic aberration at the telephoto end.

When the negative focal length of the second lens unit B2 is increased too much (when the absolute value of the negative focal length is increased too much) and the ratio falls below the lower limit of Conditional Expression (1), a magnification-varying effect decreases, and the movement amount of each lens unit is required to be increased in order to obtain a desired zoom ratio. As a result, the entire system is increased in size.

Conditional Expression (2) defines a preferred range of the refractive index of the material of the positive lens included in the second lens unit B2. In order to satisfactorily correct various aberrations, particularly, to satisfactorily correct spherical aberration, the value preferably does not fall below the lower limit of Conditional Expression (2).

Conditional Expression (3) defines a preferred range of the average value of the refractive indices of the materials of the negative lenses included in the second lens unit B2. In order to satisfactorily correct, particularly, field curvature and distortion while obtaining a desired zoom ratio, the value preferably falls within the range of Conditional Expression (3).

It is more preferred to set the numerical ranges of Conditional Expressions (1) to (3) as follows.

$$1.070 < B2D/|f2| < 1.185 \quad (1a)$$

$$1.85 < B2PN < 1.98 \quad (2a)$$

$$1.85 < B2NaveN < 1.92 \quad (3a)$$

It is more preferred to set the numerical ranges of Conditional Expressions (1a) to (3a) as follows.

$$1.0705 < B2D/|f2| < 1.1800 \quad (1b)$$

$$1.87 < B2PN < 1.95 \quad (2b)$$

$$1.86 < B2NaveN < 1.90 \quad (3b)$$

As described above, according to each Embodiment, there can be achieved a zoom lens having a high zoom ratio and excellent optical performance over the entire zoom range from the wide angle end to the telephoto end, in which variations in various aberrations accompanying focusing can be suppressed. It is more preferred to satisfy at least one of the following conditions.

The Abbe number of the material of the positive lens included in the second lens unit B2 is represented by B2Pv. The focal length of the entire system at the wide angle end is represented by fw. The focal length of the first lens unit B1 is represented by f1, and the focal length of the entire system at the telephoto end is represented by ft. The focal length of the third lens unit B3 is represented by f3. The focal length of the fourth lens unit B4 is represented by f4. The focal length of the fifth lens unit B5 is represented by f5. The fifth lens unit B5 includes a positive lens, and the refractive index and the Abbe number of a material of the positive lens included in the fifth lens unit B5 are represented by B5PN and B5Pv, respectively.

In this case, it is preferred to satisfy at least one of the following conditional expressions.

$$B2Pv < 22.0 \quad (4)$$

$$0.55 < B2D/fw < 0.80 \quad (5)$$

$$0.45 < |f2|/fw < 0.75 \quad (6)$$

$$0.80 < f1/ft < 1.20 \quad (7)$$

$$0.10 < |f2|/f1 < 0.19 \quad (8)$$

$$0.50 < |f2|/f3 < 0.80 \quad (9)$$

$$0.35 < f2/f4 < 0.80 \quad (10)$$

$$0.90 < |f4|/fw < 1.30 \quad (11)$$

$$0.35 < f3/f5 < 0.65 \quad (12)$$

$$1.51 < B5PN \quad (13)$$

$$65.0 < B5Pv \quad (14)$$

Next, the technical meanings of Conditional Expressions (4) to (14) are described. Conditional Expression (4) defines a preferred range of the Abbe number of the material of the positive lens included in the second lens unit B2. In order to satisfactorily correct the lateral chromatic aberration at the wide angle end and the axial chromatic aberration at the telephoto end, the value preferably does not exceed the upper limit of Conditional Expression (4).

Conditional Expression (5) defines a preferred range of the ratio of the thickness of the second lens unit B2 on the optical axis to the focal length of the entire system at the wide angle end. When the thickness of the second lens unit B2 is increased too much and the ratio exceeds the upper limit of Conditional Expression (5), the movement amount of the second lens unit B2 during zooming or focusing is required to be reduced, with the result that it is difficult to correct the aberration and obtain a desired zoom ratio.

When the thickness of the second lens unit B2 is reduced too much and the ratio falls below the lower limit of Conditional Expression (5), the degree of freedom in the shape of the lenses forming the second lens unit B2 is reduced, and thus the refractive indices of the materials of those lenses are required to be increased. In general, a material having a high refractive index has a small Abbe number, and is thus not suitable because it is difficult to correct chromatic aberration with such a material.

Conditional Expression (6) defines a preferred range of the ratio of the focal length of the second lens unit B2 to the focal length of the entire system at the wide angle end. When the focal length of the second lens unit B2 is increased too much and the ratio exceeds the upper limit of Conditional Expression (6), various aberrations are easily corrected, but it is difficult to obtain a desired zoom ratio. When the focal length of the second lens unit B2 is reduced too much and the ratio falls below the lower limit of Conditional Expression (6), it is difficult to correct the field curvature and the lateral chromatic aberration particularly at the wide angle end.

Conditional Expression (7) defines a preferred range of the ratio of the focal length of the first lens unit B1 to the focal length of the entire system at the telephoto end. When the focal length of the first lens unit B1 is increased too much and the ratio exceeds the upper limit of Conditional Expression (7), various aberrations are easily corrected, but it is difficult to obtain a desired zoom ratio. When the focal length of the first lens unit B1 is reduced too much and the ratio falls below the lower limit of Conditional Expression (7), it is difficult to correct the spherical aberration and the axial chromatic aberration particularly at the telephoto end.

Conditional Expression (8) defines a preferred range of the ratio of the negative focal length of the second lens unit B2 to the focal length of the first lens unit B1. When the negative focal length of the second lens unit B2 is increased too much and the ratio exceeds the upper limit of Conditional Expression (8), various aberrations are easily corrected, but it is difficult to obtain a desired zoom ratio. When the focal length of the first lens unit B1 is increased too much and the ratio falls below the lower limit of Conditional Expression (8), it is difficult to correct the spherical aberration and the axial chromatic aberration particularly at the telephoto end.

Conditional Expression (9) defines a preferred range of the ratio of the negative focal length of the second lens unit B2 to the focal length of the third lens unit B3. When the focal length of the third lens unit B3 is reduced too much and the ratio exceeds the upper limit of Conditional Expression (9), a desired zoom ratio is easily obtained, but it is difficult to correct the spherical aberration particularly at the telephoto end. When the negative focal length of the second lens unit B2 is reduced too much and the ratio falls below the lower limit of Conditional Expression (9), it is difficult to correct the field curvature and the lateral chromatic aberration particularly at the wide angle end.

Conditional Expression (10) defines a preferred range of the ratio of the negative focal length of the second lens unit B2 to the negative focal length of the fourth lens unit B4. When the negative focal length of the fourth lens unit B4 is reduced too much and the ratio exceeds the upper limit of Conditional Expression (10), an effect of reducing the entire system in size is easily obtained, but it is particularly difficult to correct the field curvature at the wide angle end and the spherical aberration at the telephoto end. When the negative focal length of the second lens unit B2 is reduced too much and the ratio falls below the lower limit of Conditional Expression (10), it is difficult to correct the field curvature and the lateral chromatic aberration particularly at the wide angle end.

Conditional Expression (11) defines a preferred range of the ratio of the negative focal length of the fourth lens unit B4 to the focal length of the entire system at the wide angle end. When the negative focal length of the fourth lens unit B4 is increased too much and the ratio exceeds the upper limit of Conditional Expression (11), an image stabilization effect that is exhibited when an image is stabilized by the fourth lens unit B4 is weakened, with the result that the movement amount of the fourth lens unit B4 during image stabilization is required to be increased, and it is thus difficult to reduce the entire system in size. When the negative focal length of the fourth lens unit B4 is reduced too much and the ratio falls below the lower limit of Conditional Expression (11), a desired image stabilization effect is easily obtained, but it is difficult to correct the field curvature and the lateral chromatic aberration particularly at the wide angle end.

Conditional Expression (12) defines a preferred range of the ratio of the focal length of the third lens unit B3 to the focal length of the fifth lens unit B5. When the focal length of the fifth lens unit B5 is reduced too much and the ratio exceeds the upper limit of Conditional Expression (12), it is difficult to correct the field curvature and the lateral chromatic aberration at the wide angle end. When the focal length of the third lens unit B3 is reduced too much and the ratio falls below the lower limit of Conditional Expression (12), it is difficult to correct the spherical aberration particularly at the telephoto end.

Conditional Expression (13) defines a preferred range of the refractive index of the material of the positive lens in the fifth lens unit B5. In order to satisfactorily correct the field curvature at the wide angle end, the value preferably does not fall below the lower limit of Conditional Expression (13). Conditional Expression (14) defines a preferred range of the Abbe number of the material of the positive lens included in the fifth lens unit B5. In order to satisfactorily correct the lateral chromatic aberration at the wide angle end, the value preferably does not fall below the lower limit of Conditional Expression (14).

It is more preferred to set the numerical ranges of Conditional Expressions (4) to (14) as follows.

$$20.0 < B2P\nu < 22.0 \tag{4a}$$

$$0.60 < B2D/fw < 0.75 \tag{5a}$$

$$0.50 < |f2|/fw < 0.70 \tag{6a}$$

$$0.85 < f1/ft < 1.10 \tag{7a}$$

$$0.12 < |f2|/f1 < 0.17 \tag{8a}$$

$$0.55 < |f2|/f3 < 0.75 \tag{9a}$$

$$0.40 < f2/f4 < 0.75 \tag{10a}$$

$$0.95 < |f4|/fw < 1.20 \tag{11a}$$

$$0.40 < f3/f5 < 0.57 \tag{12a}$$

$$1.51 < B5PN < 1.65 \tag{13a}$$

$$65.0 < B5P\nu < 80.0 \tag{14a}$$

It is still more preferred to set the numerical ranges of Conditional Expressions (4a) to (14a) as follows.

$$20.0 < B2P\nu < 21.0 \tag{4b}$$

$$0.65 < B2D/fw < 0.72 \tag{5b}$$

$$0.54 < |f2|/fw < 0.67 \tag{6b}$$

$$0.90 < f1/ft < 1.00 \tag{7b}$$

$$0.13 < |f2|/f1 < 0.16 \tag{8b}$$

$$0.57 < |f2|/f3 < 0.72 \tag{9b}$$

$$0.45 < f2/f4 < 0.68 \tag{10b}$$

$$0.98 < |f4|/fw < 1.18 \tag{11b}$$

$$0.41 < f3/f5 < 0.53 \tag{12b}$$

$$1.52 < B5PN < 1.60 \tag{13b}$$

$$67.0 < B5P\nu < 77.0 \tag{14b}$$

In each Embodiment, it is preferred to take the following configuration. Both the surfaces of the lens closest to the object side of the second lens unit B2 preferably have aspherical shapes. With such a lens, the distortion and the field curvature are easily and satisfactorily corrected at the wide angle end.

On the image side of the third lens unit B3, the fourth lens unit B4 having the negative refractive power and the fifth lens unit B5 having the positive refractive power are preferably arranged in the stated order. The reason is that, when the lens units having the positive, negative, positive, negative, and positive refractive powers are arranged in the entire system in order from the object side, the aberration is easily corrected because the lens unit having the positive refractive power and the lens unit having the negative refractive power are alternately arranged, and the refractive power arrangement is symmetrical.

The fourth lens unit B4 preferably moves in a direction having a component in a direction perpendicular to the optical axis, thereby stabilizing an image. In particular, the fourth lens unit B4 has the smallest diameter in the entire system, and enables the structure of a mechanical mechanism arranged for image stabilization to be compact. The fourth lens unit B4 preferably includes at least one positive lens and one negative lens, and with such a fourth lens unit B4, reduction in entire system in size and obtainment of high optical performance are easily achieved. The fourth lens unit B4 more preferably consists of one positive lens and one negative lens.

At least one surface of the third lens unit B3 preferably has an aspherical shape. With such a third lens unit B3, the spherical aberration is easily corrected at the telephoto end. Further, the fifth lens unit B5 preferably consists of at least three lenses in terms of aberration correction. Further, at least one surface of the fifth lens unit B5 preferably has an aspherical shape. With such a fifth lens unit B5, the field curvature is easily corrected at the wide angle end.

Next, an embodiment of a digital still camera in which the zoom lens of the present invention is used as an image pickup optical system is described with reference to FIG. 7. In FIG. 7, the digital still camera includes a camera main body 20 and an image pickup optical system 21 including the zoom lens described in any one of Embodiments. An image pickup element (photoelectric conversion element) 22, for example, a CCD sensor or a CMOS sensor, is included in the camera main body 20 to receive a subject image formed by the image pickup optical system 21.

A memory 23 records information corresponding to a subject image that has been photoelectrically converted by the image pickup element 22. A viewfinder 24 is formed of a liquid crystal display panel or the like, and is used to observe the subject image formed on the image pickup element 22.

The present invention may be equally applied to the video camera (image pickup apparatus) using the zoom lens of the present invention as the optical system. Through application of the zoom lens of the present invention to the image pickup apparatus, for example, the digital still camera or the video camera in such a manner, a compact image pickup apparatus having high optical performance can be achieved.

Next, Numerical Embodiment corresponding to each Embodiment of the present invention is described. In each Numerical Embodiment, symbol i represents the order of an optical plane from the object side. Symbol ri represents a curvature radius of the i-th optical plane; di, an air interval between an i-th surface and an (i+1)-th surface; and ndi and vdi, a refractive index and an Abbe number of a material of an optical member between the i-th surface and the (i+1)-th surface with respect to the d-line, respectively. Back focus (BF) is an air-converted distance between a final lens surface and a paraxial image plane. The total lens length is a value obtained by adding the back focus (BF) to a distance between a first lens surface and the final lens surface.

In Numerical Embodiment, the last two surfaces are surfaces of the optical block such as the filter or the face plate. In addition, symbol K represents an eccentricity, symbols A4, A6, A8, A10, and A12 represent aspherical coefficients, and a displacement in the optical axis direction at a position of a height H from the optical axis with respect to a surface vertex is represented by symbol x. Then, an aspherical shape is expressed by the following expression.

$$X = \frac{(1/R)H^2}{1+\sqrt{1-(1+K)(H/R)^2}} + A4H^4 + A6H^6 + A8H^8 + A10H^{10} + A12H^{12}$$

where R represents a paraxial curvature radius. Further, for example, the expression of "e-Z" means "$10^{-z}$". Further, the correspondences between each Numerical Embodiment and the conditional expressions described above are shown in Table 1. A half angle of view is a value obtained by ray tracing. An aspherical surface is indicated by a surface number with a suffix "*". The relationships between each conditional expression described above and various values in Numerical Embodiment are shown in Table 1.

Numerical Embodiment 1

Unit mm

Surface data

| Surface number i | ri | di | ndi | vdi |
|---|---|---|---|---|
| 1 | 178.434 | 1.80 | 1.84666 | 23.9 |
| 2 | 68.215 | 7.84 | 1.72916 | 54.7 |
| 3 | 751.188 | 0.15 | | |
| 4 | 50.147 | 5.96 | 1.77250 | 49.6 |
| 5 | 104.481 | (Variable) | | |
| 6* | 115.979 | 1.60 | 1.85135 | 40.1 |
| 7* | 14.222 | 7.07 | | |
| 8 | −37.011 | 1.10 | 1.91082 | 35.3 |
| 9 | 69.605 | 0.15 | | |
| 10 | 40.887 | 4.50 | 1.89286 | 20.4 |
| 11 | −40.887 | 0.89 | | |
| 12 | −25.711 | 1.10 | 1.83481 | 42.7 |
| 13 | −73.036 | (Variable) | | |
| 14 (FP) | ∞ | 0.20 | | |
| 15 | 45.063 | 4.20 | 1.59522 | 67.7 |
| 16 | −180.813 | 3.15 | | |
| 17 (Stop) | ∞ | 0.20 | | |
| 18 | 30.571 | 1.40 | 2.00069 | 25.5 |
| 19 | 16.729 | 9.80 | 1.63854 | 55.4 |
| 20 | −315.502 | 0.20 | | |
| 21* | 47.174 | 4.90 | 1.58313 | 59.4 |
| 22 | −62.428 | (Variable) | | |
| 23 | −44.409 | 3.65 | 1.84666 | 23.9 |
| 24 | −16.518 | 1.00 | 1.76802 | 49.2 |
| 25* | 37.556 | (Variable) | | |
| 26* | 46.372 | 1.30 | 1.83220 | 40.1 |
| 27 | 24.151 | 10.50 | 1.53775 | 74.7 |
| 28 | −30.802 | 0.20 | | |
| 29 | −123.196 | 7.60 | 1.48749 | 70.2 |
| 30 | −19.698 | 1.60 | 2.00100 | 29.1 |
| 31 | −38.489 | (Variable) | | |
| 32 | ∞ | 1.20 | 1.51633 | 64.1 |
| 33 | ∞ | 0.69 | | |
| Image plane | ∞ | | | |

Aspherical surface data

Sixth surface

K = 0.00000e+000   A4 = 1.20558e−005   A6 = −6.28320e−008
A8 = 2.64843e−010   A10 = −6.26254e−013   A12 = 7.20141e−016

Seventh surface

K = 0.00000e+000   A4 = 1.34983e−006   A6 = −1.01881e−007
A8 = 5.74225e−010   A10 = −5.51879e−012   A12 = 1.60555e−014

Twenty-first surface

K = 0.00000e+000   A4 = −8.16725e−006   A6 = 7.80825e−009
A8 = 2.82746e−011   A10 = 6.09225e−014   A12 = 2.43222e−016

Twenty-fifth surface

K = 0.00000e+000   A4 = −9.06418e−006   A6 = 2.95444e−009
A8 = 6.99562e−011   A10 = −3.74665e−013

-continued

Unit mm

Twenty-sixth surface

K = 0.00000e+000   A4 = −2.62853e−006   A6 = 1.20172e−008
A8 = −1.53772e−012   A10 = −7.72619e−015

Various data
Zoom ratio 4.13

|  | Wide angle | Intermediate | Telephoto |
|---|---|---|---|
| Focal length | 24.69 | 49.90 | 102.08 |
| F-number | 4.12 | 4.12 | 4.12 |
| Half angle of view (degrees) | 41.23 | 23.44 | 11.97 |
| Image height | 21.64 | 21.64 | 21.64 |
| Total lens length | 159.97 | 173.88 | 197.86 |
| BF | 40.03 | 50.12 | 63.88 |
| d5 | 2.53 | 18.62 | 35.63 |
| d13 | 21.85 | 9.58 | 2.78 |
| d22 | 2.01 | 7.41 | 11.28 |
| d25 | 11.50 | 6.10 | 2.22 |
| d31 | 38.55 | 48.63 | 62.40 |

Zoom lens unit data

| Unit | First surface | Focal length |
|---|---|---|
| 1 | 1 | 96.47 |
| 2 | 6 | −13.93 |
| 3 | 14 | 23.28 |
| 4 | 23 | −28.16 |
| 5 | 26 | 53.39 |
| 6 | 32 | ∞ |

Numerical Embodiment 2

Unit mm

Surface data

| Surface number i | ri | di | ndi | vdi |
|---|---|---|---|---|
| 1 | 224.088 | 1.80 | 1.84666 | 23.9 |
| 2 | 71.763 | 7.85 | 1.72916 | 54.7 |
| 3 | 1901.257 | 0.15 | | |
| 4 | 52.180 | 5.79 | 1.80400 | 46.6 |
| 5 | 108.146 | (Variable) | | |
| 6* | 112.099 | 1.60 | 1.85135 | 40.1 |
| 7* | 14.484 | 7.31 | | |
| 8 | −42.223 | 1.10 | 1.91082 | 35.3 |
| 9 | 67.006 | 0.25 | | |
| 10 | 39.222 | 4.57 | 1.92286 | 20.9 |
| 11 | −44.946 | 0.60 | | |
| 12 | −33.023 | 1.10 | 1.88300 | 40.8 |
| 13 | −166.305 | (Variable) | | |
| 14 (FP) | ∞ | 0.20 | | |
| 15 | 43.280 | 4.25 | 1.65160 | 58.5 |
| 16 | −516.529 | 3.15 | | |
| 17 (Stop) | ∞ | 0.20 | | |
| 18 | 34.987 | 1.40 | 2.00069 | 25.5 |
| 19 | 15.316 | 8.81 | 1.74400 | 44.8 |
| 20 | 162.173 | 0.51 | | |
| 21* | 38.542 | 5.59 | 1.58313 | 59.4 |
| 22 | −48.678 | (Variable) | | |
| 23 | −44.610 | 3.41 | 1.84666 | 23.9 |
| 24 | −16.079 | 1.00 | 1.76802 | 49.2 |
| 25* | 34.698 | (Variable) | | |
| 26* | 44.647 | 1.30 | 1.83220 | 40.1 |
| 27 | 23.373 | 10.86 | 1.59522 | 67.7 |
| 28 | −29.940 | 0.20 | | |
| 29 | −75.179 | 6.88 | 1.49700 | 81.5 |
| 30 | −19.678 | 1.60 | 2.00100 | 29.1 |
| 31 | −40.793 | (Variable) | | |
| 32 | ∞ | 1.20 | 1.51633 | 64.1 |
| 33 | ∞ | 0.68 | | |
| Image plane | ∞ | | | |

Aspherical surface data

Sixth surface

K = 0.00000e+000   A4 = 8.04111e−006   A6 = −2.38439e−008
A8 = 7.86059e−012   A10 = 1.10211e−013   A12 = −1.50875e−016

Seventh surface

K = 0.00000e+000   A4 = −3.07786e−008   A6 = −7.72062e−008
A8 = 8.40874e−010   A10 = −8.38088e−012   A12 = 1.69016e−014

Twenty-first surface

K = 0.00000e+000   A4 = −8.14003e−006   A6 = 3.32447e−009
A8 = 1.28390e−010   A10 = −4.82709e−013   A12 = 2.03584e−015

Twenty-fifth surface

K = 0.00000e+000   A4 = −8.90655e−006   A6 = 6.94539e−009
A8 = −3.02307e−011   A10 = 1.65876e−013

Twenty-sixth surface

K = 0.00000e+000   A4 = −3.96885e−006   A6 = 1.12148e−008
A8 = 1.52759e−012   A10 = −1.03181e−014

Various data
Zoom ratio 4.13

|  | Wide angle | Intermediate | Telephoto |
|---|---|---|---|
| Focal length | 24.68 | 49.90 | 101.90 |
| F-number | 4.12 | 4.12 | 4.12 |
| Half angle of view (degrees) | 41.24 | 23.44 | 11.99 |
| Image height | 21.64 | 21.64 | 21.64 |
| Total lens length | 159.97 | 174.27 | 198.13 |
| BF | 39.97 | 50.03 | 64.51 |
| d5 | 2.67 | 19.61 | 36.35 |
| d13 | 22.86 | 10.15 | 2.80 |
| d22 | 2.00 | 6.85 | 10.58 |
| d25 | 10.99 | 6.14 | 2.42 |
| d31 | 38.50 | 48.56 | 63.04 |

Zoom lens unit data

| Unit | First surface | Focal length |
|---|---|---|
| 1 | 1 | 99.62 |
| 2 | 6 | −14.87 |
| 3 | 14 | 23.63 |
| 4 | 23 | −27.03 |
| 5 | 26 | 49.75 |
| 6 | 32 | ∞ |

Numerical Embodiment 3

Unit mm

Surface data

| Surface number i | ri | di | ndi | vdi |
|---|---|---|---|---|
| 1 | ∞ | 1.65 | | |
| 2 | 166.778 | 1.80 | 1.92286 | 20.9 |
| 3 | 84.075 | 8.06 | 1.69680 | 55.5 |
| 4 | 2992.036 | 0.15 | | |
| 5 | 52.903 | 6.03 | 1.77250 | 49.6 |
| 6 | 95.507 | (Variable) | | |
| 7* | 108.805 | 1.20 | 1.85400 | 40.4 |
| 8* | 14.817 | 7.71 | | |
| 9 | −31.872 | 1.00 | 1.91082 | 35.3 |

-continued

Unit mm

| | | | | |
|---|---|---|---|---|
| 10 | 74.348 | 0.15 | | |
| 11 | 46.576 | 4.81 | 1.89286 | 20.4 |
| 12 | −40.474 | 1.33 | | |
| 13 | −21.744 | 1.20 | 1.90043 | 37.4 |
| 14 | −31.301 | (Variable) | | |
| 15 (FP) | ∞ | 0.00 | | |
| 16 | 34.171 | 3.45 | 1.49700 | 81.5 |
| 17 | 276.967 | 1.27 | | |
| 18 (Stop) | ∞ | 0.02 | | |
| 19 | 27.120 | 1.30 | 2.00069 | 25.5 |
| 20 | 16.666 | 8.59 | 1.59522 | 67.7 |
| 21 | −83.122 | 0.15 | | |
| 22* | 70.781 | 4.02 | 1.58313 | 59.4 |
| 23 | −73.314 | (Variable) | | |
| 24 | −52.048 | 3.38 | 1.84666 | 23.9 |
| 25 | −16.921 | 0.80 | 1.77250 | 49.5 |
| 26* | 48.547 | 2.91 | | |
| 27 | −74.465 | 1.61 | 1.73800 | 32.3 |
| 28 | −49.815 | 1.00 | 1.69680 | 55.5 |
| 29 | 575.566 | (Variable) | | |
| 30* | 94.645 | 6.40 | 1.58313 | 59.4 |
| 31 | −25.902 | 0.15 | | |
| 32 | −155.181 | 7.02 | 1.53775 | 74.7 |
| 33 | −19.216 | 2.00 | 2.00069 | 25.5 |
| 34 | −48.362 | (Variable) | | |
| 35 | ∞ | 1.20 | 1.51633 | 64.1 |
| 36 | ∞ | 3.33 | | |
| Image plane | ∞ | | | |

Aspherical surface data

Seventh surface

K = 0.00000e+000  A4 = 9.75944e−006  A6 = −2.20135e−008
A8 = 4.80283e−011  A10 = 8.65193e−015

Eighth surface

K = 0.00000e+000  A4 = −2.64921e−006  A6 = −3.44175e−008
A8 = 4.10905e−011  A10 = −5.13889e−013

Twenty-second surface

K = 0.00000e+000  A4 = −1.27213e−005  A6 = 1.71920e−009
A8 = 1.78439e−011  A10 = 1.15123e−013

Twenty-sixth surface

K = 0.00000e+000  A4 = −5.30386e−006  A6 = 1.17191e−008
A8 = 1.27946e−011  A10 = −1.04782e−013

Thirtieth surface

K = 0.00000e+000  A4 = −6.90790e−006  A6 = 6.91316e−009
A8 = 2.46451e−011  A10 = −6.23289e−014

Various data
Zoom ratio 4.66

| | Wide angle | Intermediate | Telephoto |
|---|---|---|---|
| Focal length | 24.70 | 50.00 | 114.99 |
| F-number | 4.12 | 4.12 | 4.12 |
| Half angle of view (degrees) | 41.21 | 23.40 | 10.66 |
| Image height | 21.64 | 21.64 | 21.64 |
| Total lens length | 157.00 | 172.83 | 199.66 |
| BF | 42.00 | 51.06 | 65.72 |
| d6 | 2.52 | 22.24 | 43.51 |
| d14 | 23.45 | 10.51 | 1.40 |
| d23 | 2.00 | 5.77 | 8.86 |
| d29 | 7.86 | 4.09 | 1.00 |
| d34 | 37.88 | 46.94 | 61.60 |

Zoom lens unit data

| Unit | First surface | Focal length |
|---|---|---|
| 1 | 1 | 105.43 |
| 2 | 7 | −16.15 |
| 3 | 15 | 23.30 |
| 4 | 24 | −25.15 |
| 5 | 30 | 45.98 |
| 6 | 35 | ∞ |

TABLE 1

| Conditional Expression | | Numerical Embodiment | | |
|---|---|---|---|---|
| | | 1 | 2 | 3 |
| (1) | B2D/|f2| | 1.178 | 1.112 | 1.077 |
| (2) | B2PN | 1.893 | 1.923 | 1.893 |
| (3) | B2NaveN | 1.866 | 1.882 | 1.888 |
| (4) | B2Pv | 20.36 | 20.88 | 20.36 |
| (5) | B2D/fw | 0.665 | 0.670 | 0.705 |
| (6) | |f2|/fw | 0.564 | 0.602 | 0.654 |
| (7) | f1/ft | 0.945 | 0.978 | 0.917 |
| (8) | |f2|/f1 | 0.144 | 0.149 | 0.153 |
| (9) | |f2|/f3 | 0.598 | 0.629 | 0.693 |
| (10) | f2/f4 | 0.495 | 0.550 | 0.642 |
| (11) | |f4|/fw | 1.141 | 1.095 | 1.018 |
| (12) | f3/f5 | 0.436 | 0.475 | 0.507 |
| (13) | B5PN | 1.538 | 1.595 | 1.538 |
| (14) | B5Pv | 74.70 | 67.74 | 74.70 |
| | fw | 24.690 | 24.680 | 24.702 |
| | ft | 102.083 | 101.902 | 114.991 |
| | B2D | 16.413 | 16.529 | 17.403 |
| | B2PN | 1.893 | 1.923 | 1.893 |
| | B2NaveN | 1.866 | 1.882 | 1.888 |
| | B2Pv | 20.36 | 20.88 | 20.36 |
| | B5PN | 1.538 | 1.595 | 1.538 |
| | B5Pv | 74.700 | 67.740 | 74.700 |
| | f1 | 96.467 | 99.619 | 105.428 |
| | f2 | −13.931 | −14.868 | −16.152 |
| | f3 | 23.285 | 23.633 | 23.296 |
| | f4 | −28.162 | −27.026 | −25.147 |
| | f5 | 53.391 | 49.750 | 45.983 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-126417, filed Jun. 27, 2016, which is hereby incorporated by reference herein in its entirety.

What is claimed is:

1. A zoom lens, comprising, in order from an object side to an image side:

a first lens unit having a positive refractive power;
a second lens unit having a negative refractive power;
a third lens unit having a positive refractive power;
a fourth lens unit having a negative refractive power; and
a fifth lens unit having a positive refractive power,
wherein an interval between each pair of adjacent lens units is changed during zooming,
wherein the second lens unit moves during focusing, and comprises, in order from the object side to the image side, a negative lens, a negative lens, a positive lens, and a negative lens, and
wherein the following conditional expressions are satisfied:

$1.065 < B2D/|f2| < 1.190;$ $1.85 < B2PN;$ and $1.85 < B2NaveN,$ where f2 represents a focal length of the second lens unit, B2D represents a thickness of the second lens unit on an optical axis, B2PN represents a refractive index of a material of the positive lens included in the second lens unit, and B2NaveN represents an average value of refractive indices of materials of the negative lenses included in the second lens unit.

2. A zoom lens according to claim 1, wherein the following conditional expression is satisfied:

$$B2Pv < 22.0,$$

where B2Pv represents an Abbe number of the material of the positive lens included in the second lens unit.

3. A zoom lens according to claim 1, wherein the following conditional expression is satisfied:

$$0.55 < B2D/fw < 0.80,$$

where fw represents a focal length of the zoom lens at a wide angle end.

4. A zoom lens according to claim 1, wherein the following conditional expression is satisfied:

$$0.45 < |f2|/fw < 0.75,$$

where fw represents a focal length of the zoom lens at a wide angle end.

5. A zoom lens according to claim 1, wherein the following conditional expression is satisfied:

$$0.80 < f1/ft < 1.20,$$

where f1 represents a focal length of the first lens unit, and ft represents a focal length of the zoom lens at a telephoto end.

6. A zoom lens according to claim 1, wherein the following conditional expression is satisfied:

$$0.10 < |f2|/f1 < 0.19,$$

where f1 represents a focal length of the first lens unit.

7. A zoom lens according to claim 1, wherein the following conditional expression is satisfied:

$$0.50 < |f2|/f3 < 0.80,$$

where f3 represents a focal length of the third lens unit.

8. A zoom lens according to claim 1, wherein the following conditional expression is satisfied:

$$0.35 < f2/f4 < 0.80,$$

where f4 represents a focal length of the fourth lens unit.

9. A zoom lens according to claim 1, wherein the following conditional expression is satisfied:

$$0.90 < |f4|/fw < 1.30,$$

where f4 represents a focal length of the fourth lens unit, and fw represents a focal length of the zoom lens at a wide angle end.

10. A zoom lens according to claim 1, wherein the following conditional expression is satisfied:

$$0.35 < f3/f5 < 0.65,$$

where f3 represents a focal length of the third lens unit, and f5 represents a focal length of the fifth lens unit.

11. A zoom lens according to claim 1, wherein the fifth lens unit comprises a positive lens made of a material satisfying the following conditional expressions:

$$1.51 < B5PN; \text{ and}$$

$$65.0 < B5Pv,$$

where B5PN and B5Pv respectively represent a refractive index and an Abbe number of the material of the positive lens included in the fifth lens unit.

12. A zoom lens according to claim 1, wherein the fourth lens unit moves in a direction having a component in a direction perpendicular to the optical axis during image stabilization.

13. A zoom lens according to claim 1, wherein during zooming from a wide angle end to a telephoto end, the first lens unit moves toward the object side, the second lens unit moves toward the image side and then toward the object side, the third lens unit moves toward the object side, the fourth lens unit moves toward the object side, and the fifth lens unit moves toward the object side.

14. A zoom lens according to claim 1, wherein the zoom lens consists of, in order from the object side to the image side:

the first lens unit having a positive refractive power;
the second lens unit having a negative refractive power;
the third lens unit having a positive refractive power;
the fourth lens unit having a negative refractive power; and
the fifth lens unit having a positive refractive power.

15. A zoom lens according to claim 14, wherein the second lens unit consists of, in order from the object side to the image side, the negative lens, the negative lens, the positive lens, and the negative lens.

16. An image pickup apparatus, comprising:
a zoom lens; and
an image pickup element which receives an image formed by the zoom lens,
the zoom lens comprising, in order from an object side to an image side:
  a first lens unit having a positive refractive power;
  a second lens unit having a negative refractive power;
  a third lens unit having a positive refractive power;
  a fourth lens unit having a negative refractive power; and
  a fifth lens unit having a positive refractive power,
wherein an interval between each pair of adjacent lens units is changed during zooming,
wherein the second lens unit moves during focusing, and comprises, in order from the object side to the image side, a negative lens, a negative lens, a positive lens, and a negative lens, and
wherein the following conditional expressions are satisfied:

$$1.065 < B2D/|f2| < 1.190;$$

$$1.85 < B2PN; \text{ and}$$

$$1.85 < B2NaveN,$$

where f2 represents a focal length of the second lens unit, B2D represents a thickness of the second lens unit on an optical axis, B2PN represents a refractive index of a material of the positive lens included in the second lens unit, and B2NaveN represents an average value of refractive indices of materials of the negative lenses included in the second lens unit.

* * * * *